March 17, 1964     H. C. ZEISLOFT     3,125,118
THROTTLING VALVES
Original Filed Jan. 14, 1960     2 Sheets-Sheet 1
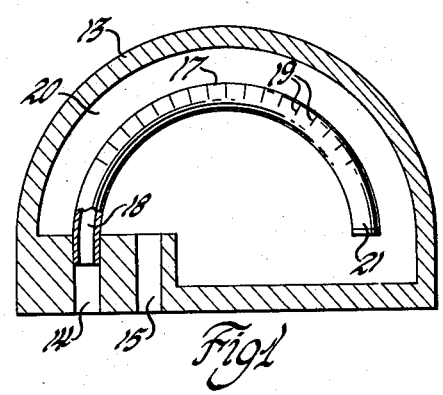
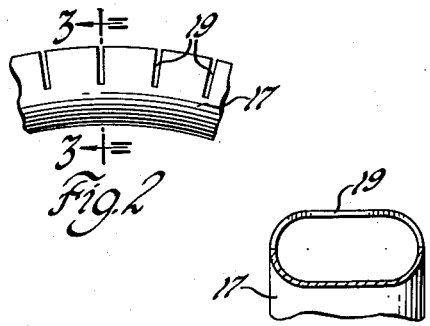
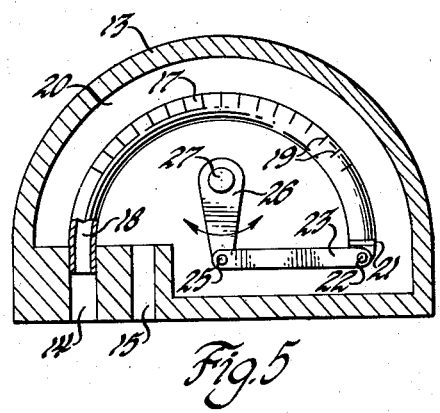
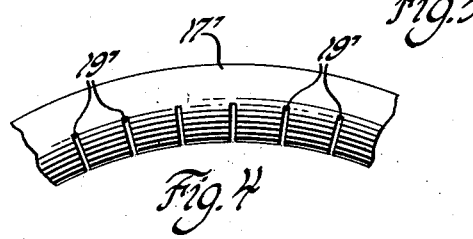
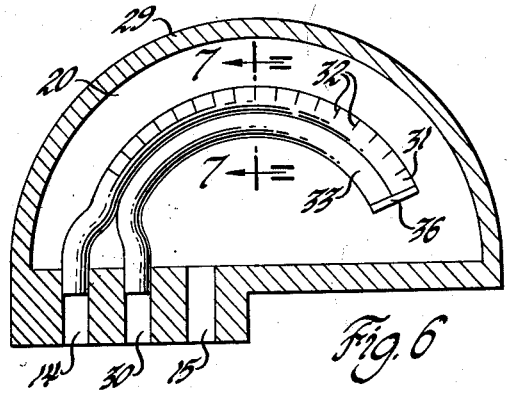
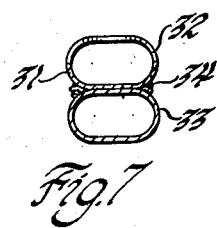
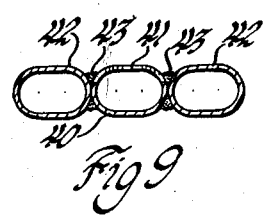
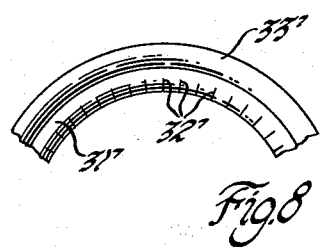
INVENTOR.
Harry C. Zeisloft
BY
Paul Fitzpatrick
ATTORNEY INVENTOR.
Harry C. Zeisloft
BY
Paul Fitzpatrick
ATTORNEY United States Patent Office 3,125,118
Patented Mar. 17, 1964

3,125,118
THROTTLING VALVES
Harry C. Zeisloft, Flint, Mich., assignor to General Motors Corporation, Detroit, Mich., a corporation of Delaware
Original application Jan. 14, 1960, Ser. No. 2,401. Divided and this application Apr. 16, 1963, Ser. No. 273,409
8 Claims. (Cl. 137—494)

This application is a division of my application Serial No. 2,401, for Throttling Valves, filed January 14, 1960, now abandoned.

My invention is directed to throttling valves in which the flow area is varied by elastic deformation of a curved elastic tube. I provide slits generally normal to the axis of the curved tube, either in the outer or inner side of the tube, these slits being opened or closed by changes in the curvature of the tube. Such a throttling device is suited to many applications in the control of fluid flow. It is adapted to control of the throttling valve, that is, of the area of the slits, by various types of control means. For example, the curvature of the elastic tube may be varied by forcible deformation of the tube by any mechanical connection to the tube; it may be varied by pressure within the tube or by pressure within a Bourdon tube connected to the elastic tube; it may be varied by the effect of centrifugal force on such an elastic tube mounted on a rotating member; and it may be varied by combinations of such control means or other means adapted to vary the curvature of the slitted elastic tube.

The principal objects of the invention are to provide improved throttling valves and improved control mechanisms embodying throttle valves; to provide a throttling valve which has no relatively sliding valve parts nor any relatively movable valve parts in the usual sense; and to provide throttling valves of extremely simple construction adapted to a variety of requirements and situations.

The nature of the invention and the advantages thereof will be apparent to those skilled in the art from the succeeding detailed description of preferred embodiments of the invention and the accompanying drawings thereof. It will be understood that the drawings are of a somewhat schematic nature, since it is desirable in the interest of conciseness to eliminate immaterial details of structure which may be a matter of choice in accordance with usual design principles.

FIGURE 1 is a sectional view of a throttling valve.

FIGURE 2 is an enlarged fragmentary view of a portion of FIGURE 1.

FIGURE 3 is a transverse section of the elastic tube taken on the plane indicated by the line 3—3 in FIGURE 2.

FIGURE 4 is a fragmentary view, corresponding to FIGURE 2, illustrating a second embodiment of the invention.

FIGURE 5 is a sectional view of a shaft-operated throttling valve.

FIGURE 6 is a sectional view of a pressure-responsive throttling valve.

FIGURE 7 is a fragmentary sectional view thereof taken on the plane indicated by the line 7—7 in FIGURE 6.

FIGURE 8 is a fragmentary view, corresponding to a portion of FIGURE 6, illustrating a further embodiment of the invention.

FIGURE 9 is a fragmentary sectional view illustrating a modification.

Figure 10:
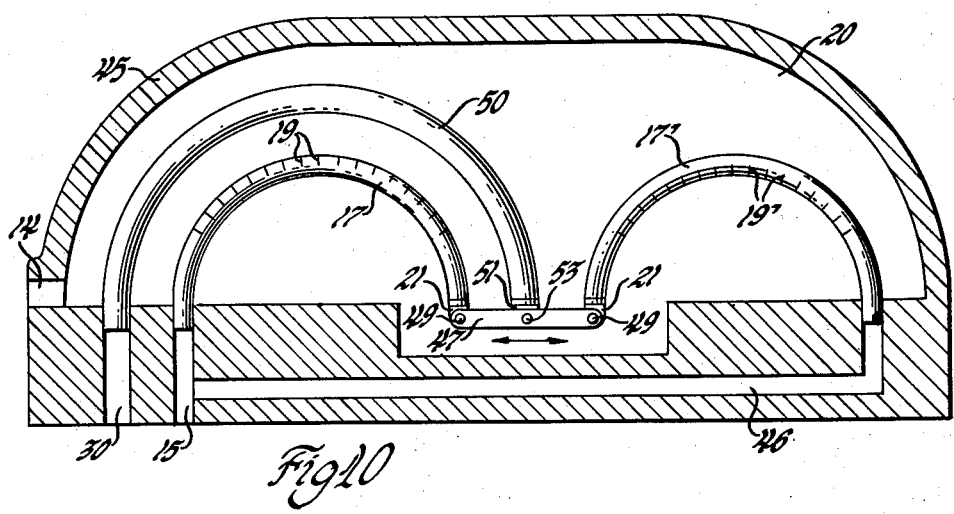
FIGURE 10 is a sectional view of a throttling valve embodying elastic tubes reversely coupled to a control member.

Referring first to FIGURE 1, the throttling device includes a closed case or housing 13 having two fluid ports 14 and 15 which may be connected to external fluid lines. Port 14 may be a fluid inlet and port 15 is a fluid outlet, or these functions may be reversed. A curved elastic tube 17, preferably metallic, has an open end 18 fixedly mounted in the case and communicating with port 14. As shown most clearly in FIGURE 3, tube 17 is preferably of flattened or oval cross-section. The tube has a number of narrow slits 19 distributed along its length and preferably extending substantially normally to the axis of the tube at the location of each slit and approximately halfway through the tube. As illustrated in FIGURES 1, 2, and 3, the slits are at the outer side of the axis of the tube. The outer or movable end of tube 17 is closed by a fitting or plug 21 which may be brazed to the tube, or the end of the tube may be closed in any desired manner. The curvature of tube 17 will be determined by the pressure difference between the interior of the tube and the chamber 20 within the housing 13. If port 14 is the inlet or higher pressure port, as this pressure increases with respect to that in outlet port 15 and chamber 20, the elastic tube 17 will increase in radius and progressively decrease the width of slits 19, thus reducing the flow area of the valve and increasing the resistance to flow. On the other hand, if port 15 is the high pressure port, as this pressure increases with respect to that in port 14, the curvature of tube 17 will increase and likewise the flow area.

FIGURE 4 is a fragmentary view illustrating a modification of the structure of FIGURE 1 in which the tube 17' is similar to tube 17 except that the slits 19' are on the inner side of the axis of the tube. The action is similar to that just described except that in this case increase in curvature decreases the valve port area and decrease in pressure increases the port area.

It will be seen that the device of FIGURES 1 to 4 may be employed or connected so as to restrict the port area as the pressure difference increases or so as to increase the port area with increase in pressure difference. They may thus be used in various systems in which a valve having either of these characteristics is useful.

FIGURE 5 illustrates a second form of the invention in which the effective resistance to flow is determined by a mechanical input rather than the pressure drop across the elastic tube valve member. Corresponding parts have like numbers to those of FIGURE 1. In the structure of FIGURE 5, the fitting 21 which closes the movable end of the tube includes an extension which mounts a pin 22 connecting the movable end of the tube to a link 23 by which the end of the tube is moved to vary the curvature thereof. As illustrated, link 23 is connected by a crank pin 25 to a crank arm 26 mounted on a shaft 27 extending to the exterior of the case 13 where it may be rotated by any suitable means (not shown). Rotation of the shaft 27, by pulling or pushing on link 23, varies the curvature of the elastic tube 17. If the curvature is decreased; that is, the radius of curvature is increased, the slits 19 will be narrowed or reduced in area. If the curvature is increased, the slits 19 will be widened and increased in area. Therefore, movement of shaft 27 is operative to vary the port area of the valve and thus the effective restriction to flow of fluid from port 14 out of tube 17 into the interior cavity 20 of case 13 and out through port 15. As will be apparent, any suitable actuating or driving means could readily be substituted for the mechanical linkage shown in FIGURE 1. Also, the tube having the slits on the inner surface as illustrated in FIGURE 4 may be employed, if desired.

The structural details of the devices of FIGURES 1 to 5 may follow usual practice and, therefore, the structure and details of the casing, and so forth, will not be further described, except that it may be noted that tube 18 may be brazed within a suitably contoured hole in the case 13 communicating with port 14.

FIGURE 6 illustrates a further embodiment of the invention in which variation in port area or throttling effect of the valve is accomplished by a pressure responsive Bourdon tube connected to the slitted elastic tube. The device of FIGURE 6 is mounted in a closed case 29 similar to case 13 except that it has a control port 30 in addition to the inlet port 14 and outlet port 15. The curved elastic tube 31 is provided with a number of slits 32 on its outer surface. A pressure responsive or Bourdon tube 33 lies generally parallel to tube 31 and in contact therewith and the two are preferably brazed together along the length thereof as indicated at 34 in FIGURE 7. The outer ends of the tubes are closed by suitable means such as a cap 36 brazed thereto. The fixed ends of the tubes are separated sufficiently to permit them to be mounted in the inlet port 14 and control port 30, respectively. Increase in pressure in either of tubes 31 and 33 with respect to the pressure in chamber 20 tends to straighten both tubes and thus reduce the flow port area through slits 32. If the range of difference between the pressures at ports 14 and 15 is small relative to the range of pressure differences between ports 30 and 15 control will be exerted principally by the control pressure supplied to port 30. On the other hand, the flow may be controlled primarily by the pressure difference between ports 14 and 15 with modulation of area by an independently controllable pressure supplied to port 30.

FIGURE 8 is a fragmentary view of a modification of the structure of FIGURE 6 in which the controlling Bourdon tube 33' is mounted on the outside of the elastic tube 31' which has slits 32' on its inner surface. In the installation of such a tube, the positions of the inlet port 14 and control port 30 would be reversed from those illustrated in FIGURE 6. With the disposition of the tubes illustrated in FIGURE 8, an increase in pressure in either of tubes 31' or 33' tends to open the valve rather than to close it as in the device of FIGURE 6.

In either of the devices of FIGURE 6 or FIGURE 8, the pressure in port 15 may be higher than that in port 14 so that port 15 is the inlet port and port 14 the outlet. In this case, the pressure difference between ports 15 and 14 acts in opposition to the pressure difference between port 30 and port 15.

FIGURE 9 is a fragmentary view illustrating a modified structure applicable to a valve of the type illustrated in FIGURES 6 to 8. In this structure, the elastic tube 40 having slits 41 at either its inner or outer side is mounted between two controlling Bourdon tubes 42 which may be brazed to it as indicated at 43. While this structure is slightly more complex than that of FIGURES 6 to 8, it is more flexible than structures in which the tubes are disposed one radially within the other and is thus more sensitive to pressure changes. The mounting arrangement of the three tubes in the case will be obvious, tubes 42 being connected to a common control port.

FIGURE 10 illustrates a further form of valve which includes means to eliminate the effect of the pressure drop across the throttling slits in the elastic tube on the expansion or contraction of the tube. This is accomplished by providing two tubes coupled together so that the pressure drop between the interior and exterior of the tube is ineffective to change the curvature of the tubes. One tube has the throttling slits on its outer side and the other on its inner side and the tubes are flexed by a separate operator, illustrated in FIGURE 10 as a Bourdon tube. Proceeding with the structure shown in FIGURE 10, a case 45 having an interior cavity 20 is provided with an inlet port 14, an outlet port 15, and a control port 30. The outlet port 15 communicates directly with an elastic tube 17 which may be the same as that illustrated in FIGURE 5, having slits 19 in its outer surface. A passage 46 connects port 15 to a second elastic tube 17' such as that illustrated in FIGURE 4, having slits 19' in its inner surface. Fittings 21 on the free or movable ends of the tubes are coupled by a link 47 connected to the fittings 21 by hinge pins 49. A pressure difference between the inlet port 14 and outlet port 15 tends to increase the curvature of both tubes 17 and 17', but since they are coupled by the link 47, this pressure difference has no effect on the curvature of the tubes. The Bourdon tube 50 connected to control port 30 has a fitting 51 at its outer end connected by pin 53 to the link 47. Differences of pressure between port 30 and port 14 change the curvature of the Bourdon tube and thereby shift the link 47 to change inversely the curvature of tubes 17 and 17'. Since the slits are on opposite surfaces of these tubes, such movement changes the effective port area. If link 47 is moved to the right as shown in FIGURE 10, the slit areas are decreased in both elastic tubes, and if it moves to the left, the areas are increased. It will be noted that the structure shown in FIGURE 10 may not be stable where the port 15 is at a higher pressure than that in port 14. However, stability may be attained with the pressure difference so reversed as by providing positive guiding means for the ends of link 47. FIGURE 10 is sufficient to illustrate the principle by which the effective pressure difference between the inside and outside of the elastic tube is nullified.

Figure 11:
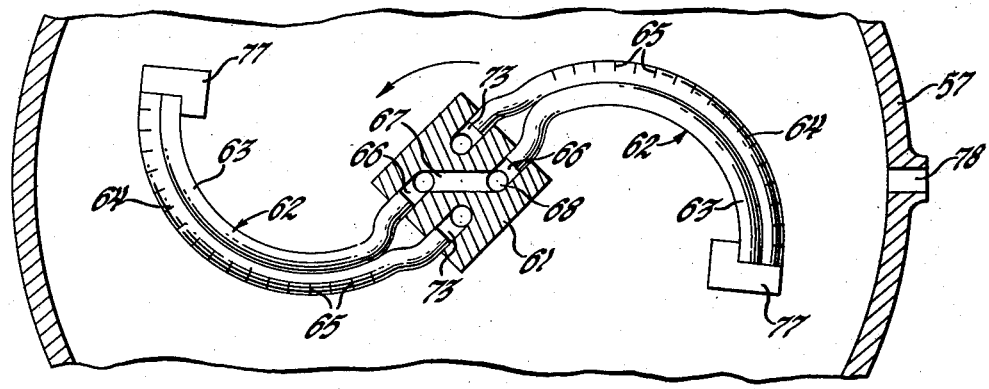
FIGURE 11 is a sectional view of a speed-responsive throttling valve.
Figure 12:
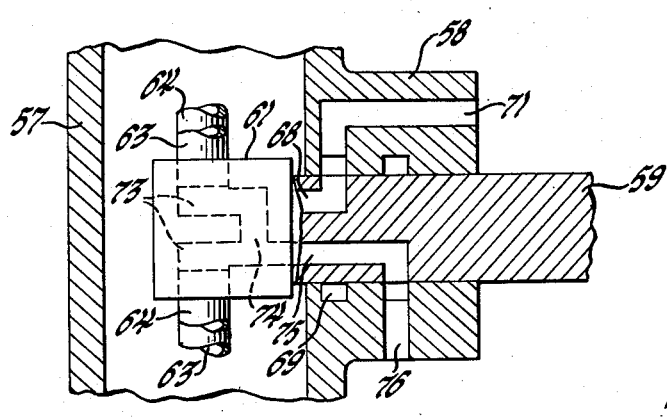
FIGURE 12 is a fragmentary view, with parts in section, further illustrating the valve shown in FIGURE 11.

FIGURES 11 and 12 illustrate a speed responsive throttling valve or governor embodying the principles of the invention.

The device of FIGURES 11 and 12 includes a case or housing 57 which may be of cylindrical form and is only partially illustrated. A boss 58 on the case journals a shaft 59 which may be rotated by any device to be controlled. A head 61 which may be integral with the shaft mounts two throttling valve devices 62 which may be similar to the tube structure 31, 33 illustrated in FIGURE 6. Each device 62 includes a Bourdon tube 63 and an elastic tube 64 provided with slits 65 in its outer surface. The tubes 62 are mounted in apertures 66 in the head 61 which are interconnected by a passage 67 in the head and communicate with passage 68. Passage 68 communicates through a recess 69 in the hub 58 with a control port 71 through which a control pressure may be supplied to both of the Bourdon tubes 63. The elastic tubes 64 are similarly mounted in openings 73 in the head which communicate through passages indicated generally by 74 in FIGURE 12 with a single passage 75 communicating with an inlet port 76 in the hub 58. The outer or free ends of tubes 63 and 64 are closed preferably by a block or flyweight 77 of appreciable mass brazed to the ends of the tubes. An outlet port 78 is provided in the case 57.

When the shaft 59 is rotated, the effect of centrifugal force on the tubes 63 and 64 and weights 77 acts to straighten the tube assemblies 62 and thereby reduce the area of slits 65. It will be apparent that the weights 77 may be omitted if the additional centrifugal force effect is not required and that they may be of any suitable mass, if present. The governor acts to control flow from port 71 through the slits 65 and out port 78 and, as the rotational speed of shaft 59 increases, it acts to close the slits and thus throttle flow. The Bourdon tubes 63 provide means for varying the operating point or characteristic curve of the governor by varying the pressure applied to port 71. Variations in this pressure change the flow area of the throttling device at any given engine speed and thus the flow passed by the governor for any given pressure drop is a function both of rotational speed and of control pressure. If modulation of the governor operating point is not required, the tubes 63 and the fluid connections to them may be omitted.

The foregoing examples of applications of the principles of the invention to various flow control situations are sufficient to demonstrate the versatility and adaptability of the invention. The elastic tube valve device is highly advantageous in that it is readily responsive to control, has no relatively moving parts which may bind or stick, and has no wearing surfaces. It has one limitation which may make it unsuitable for certain requirements in that, as a practical matter, the valve cannot close completely. The effective range of variation of flow of the valve depends primarily upon the narrowness of the slits and the amount of flexure of the elastic tube. A flow or area range of three to one or more is easily attained, so that the valve has a throttling range sufficient for many requirements.

The slits 19 may be everywhere of equal width in the normal or relaxed configuration of the tube, or they may be tapered. For example, if the tube is forcibly increased or decreased in curvature and the slits 19 are produced by sawing, the slits will converge or diverge when the tube is in its relaxed condition. Very narrow slits may be provided by sawing the tubes with a very fine diamond saw, or by other means. It is also possible to provide narrow slits by sawing or milling relatively wide slits and then compressing or working the tube so as to close the slits against a sheet of thin shim stock temporarily disposed in the slit. Except for the provision of the slits and association of plural tubes, the structures of the various valve devices illustrated involve technology usual in the common Bourdon tube type of pressure gauge and in the structure of rotating governors. For this reason, no detailed description of fabricating techniques or structural details is necessary.

The detailed description of preferred embodiments of the invention for the purpose of explaining the principles thereof is not to be considered as limiting or restricting the invention, since many modifications may be made within the scope of the invention by the exercise of skill in the art.

I claim:

1. A throttling valve comprising a curved elastic Bourdon tube, a support connected to the tube and holding one end of the tube in a fixed position, the remainder of the tube to the other end thereof standing free, actuating means coupled to the other end adapted to bias it toward and away from the support so as to tend to vary the curvature of the tube consistently, the tube being also biased to vary consistently in curvature in response to a pressure differential between the interior and the exterior of the tube, a fluid connection to the tube, and means on the tube closing the tube except for the fluid connection, the tube having a plurality of slits therein distributed along the tube and each extending generally normal to the axis of the tube disposed at one side, in the radial direction, of the axis of the tube so that variation of the curvature of the tube varies the area of the slits.

2. A throttling valve comprising a curved elastic Bourdon tube, a support connected to the tube and holding a portion of the tube fixed relative to the support, the remainder of the tube to the end thereof standing free, actuating means coupled to the free end adapted to bias it toward and away from the support so as to tend to vary the curvature of the tube consistently, the tube being also biased to vary consistently in curvature in response to a pressure differential between the interior and the exterior of the tube, a fluid connection to the said portion of the tube, and means on the tube closing the free end of the tube, the tube having a plurality of slits therein distributed along the axis of the tube disposed at one side, in the radial direction, of the axis of the tube so that variation of the curvature of the tube varies the area of the slits.

3. A throttling valve comprising a curved elastic Bourdon tube, a support connected to the tube and holding a portion of the tube fixed relative to the support, the remainder of the tube to the end thereof standing free, actuating means coupled to the free end adapted to move it toward and away from the support so as to tend to vary the curvature of the tube consistently, a fluid connection to the said portion of the tube, and means on the tube closing the free end of the tube, the tube having a plurality of slits therein distributed along the tube and each extending generally normal to the axis of the tube disposed at one side, in the radial direction, of the axis of the tube so that variation of the curvature of the tube varies the area of the slits.

4. A throttling valve comprising a curved elastic Bourdon tube, a support connected to the tube and holding a portion of the tube fixed relative to the support, the remainder of the tube including the end thereof standing free, the tube being biased to vary consistently in curvature in response to a pressure differential between the interior and the exterior of the tube, a fluid connection to the said portion of the tube, and means on the tube closing the free end of the tube, the tube having a plurality of slits therein distributed along the tube and each extending generally normal to the axis of the tube disposed at one side, in the radial direction, of the axis of the tube so that variation of the curvature of the tube varies the area of the slits.

5. A throttling valve comprising a curved elastic Bourdon tube, a support connected to the tube and holding a portion of the tube fixed relative to the support, the remainder of the tube to and including the end thereof standing free and being therefore free to vary generally uniformly in curvature in response to a pressure differential between the interior and the exterior of the tube, a fluid connection to the said portion of the tube, and means on the tube closing the free end of the tube, the tube having a plurality of slits therein distributed along the tube and each extending generally normal to the axis of the tube, the slits being disposed at one side, in the radial direction, of the axis of the tube so that variation of the pressure differential consistently varies curvature of the tube and thus consistently varies the area of the slits.

6. A throttling valve comprising a curved elastic Bourdon tube, a support connected to the tube and holding a portion of the tube fixed relative to the support, the remainder of the tube to and including the end thereof standing free and being therefore free to vary generally uniformly in curvature in response to a pressure differential between the interior and the exterior of the tube, a fluid connection to the said portion of the tube, and means on the tube closing the free end of the tube, the tube including a valve portion extending along the tube having a plurality of slits therein distributed along the valve portion, the slits being generally normal to the axis of the tube and being disposed at one side, in the radial direction, of the axis of the tube so that variation of the curvature of the tube due to variation in said pressure differential varies the area of all the slits consistently.

7. A throttling valve comprising, in combination, two curved elastic tubes each having one end connected to a fluid conduit and the other end closed, the tubes having slits therein generally normal to the axes of the tubes so that variation of the curvature of the tube varies the areas of the slits, the slits in one tube being at the outer side of the axis of the tube and the slits in the other tube being at the inner side of the axis of the tube, and control means connected to the tubes so as to vary the curvatures thereof in opposite sense.

8. A throttling valve as recited in claim 7 in which the control means is a Bourdon tube.

References Cited in the file of this patent

UNITED STATES PATENTS

| | | |
|---|---|---|
| 607,491 | Swenson | July 19, 1898 |
| 1,854,709 | Mathieson | Apr. 19, 1932 |
| 2,185,671 | Kimball | Jan. 2, 1940 |
| 2,565,059 | Altsheler | Aug. 21, 1951 |
| 2,771,320 | Korwin | Nov. 20, 1954 |